United States Patent

[11] 3,557,992

| [72] | Inventor | John F. Reeves<br>Milwaukee, Wis. |
|---|---|---|
| [21] | Appl. No. | 808,372 |
| [22] | Filed | Mar. 13, 1969 |
| [45] | Patented | Jan. 26, 1971 |
| [73] | Assignee | Litewate Transport Equipment Corporation<br>Milwaukee, Wis.<br>a corporation of Delaware<br>Continuation-in-part of application Ser. No. 733,053, May 29, 1968, now abandoned. |

[54] UNITARY MOLDED PLASTIC STRUCTURE
10 Claims, 18 Drawing Figs.

[52] U.S. Cl. .................................................. 220/9,
220/83
[51] Int. Cl. ....................................................... B65d 25/18
[50] Field of Search ............................................ 220/9F, 83;
161/Isocyn, Porous Bl., Glass Fab

[56] References Cited
UNITED STATES PATENTS

| 2,576,073 | 11/1951 | Kropa et al. | (161/Glass Fab) |
| 2,928,456 | 3/1960 | Potchen et al. | (161/Porous Bl.) |
| 3,013,922 | 12/1961 | Fisher | (220/9Fux) |
| 3,158,383 | 11/1964 | Anderson et al. | 220/9(F)X |
| 3,339,326 | 9/1967 | Derr et al. | (161/Isocyn) |
| 3,367,492 | 2/1968 | Pratt et al. | 220/9(F) |
| 3,381,843 | 5/1968 | Forman et al. | 220/9(F) |

*Primary Examiner*—Joseph R. Leclair
*Assistant Examiner*—James R. Garrett
*Attorney*—Sabin C. Bronson ABSTRACT: A method and apparatus for molding insulated reinforced plastic structures for use as refrigerated cargo containers and truck or trailer bodies. The insulated reinforced plastic structures have substantially parallel opposed sides and are molded as a unitary structure in a single molding operation. Glass fiber reinforcing materials, which include an insulating core material, are placed in the bottom of a female mold and up against the sides. A somewhat loose fitting mandrel braced vertically but which may later be expanded laterally, is lowered down in between the materials at the sides and on top of materials at the bottom. Further glass fiber reinforcing materials, including a core material are placed on top of the mandrel. A male mold is lowered in place on top of these materials but somewhat short of full final closing. A free flowing liquid plastic resin is pumped within the space defined by the male and female molds and the mandrel. The free flowing liquid plastic resin impregnates the glass fiber reinforcing and wets the surfaces of the core material. The male mold is closed fully downward and the mandrel expanded fully laterally, compressing the glass fiber reinforcing and compacting the entire material assembly in its final form. The liquid plastic resin then hardens, the molds are opened, and the molding is removed from the mold.

FIG. 1

INVENTOR
JOHN F. REEVES
BY
Curtis, Morris & Safford
ATTORNEYS

INVENTOR
JOHN F. REEVES
BY
Curtis, Morris & Safford
ATTORNEYS

INVENTOR
JOHN F. REEVES
BY
Curtis, Morris & Safford
ATTORNEYS

FIG. 9

PATENTED JAN 26 1971 3,557,992

INVENTOR
JOHN F. REEVES
BY
Curtis, Morris & Safford
ATTORNEYS

UNITARY MOLDED PLASTIC STRUCTURE

This is a continuation-in-part application of my copending application, Ser. No. 733,053 filed May 29, 1968.

BACKGROUND - SUMMARY - DRAWINGS

This invention relates to methods and apparatus for molding thermally insulated reinforced plastic structures and more in particular it relates to molding reinforced plastic structures such as refrigerated cargo containers, and refrigerated truck or trailer bodies and the like.

In the art of molding insulated reinforced plastic cargo containers, and truck or trailer bodies and like hollow containers, and in molding other objects with wall sections made of reinforced plastic, exact placement of the glass fiber reinforcing and core material within the molds is critical. Generally, the reinforcing material is placed in the mold, often being affixed to a mold wall, then plastic resin is introduced into the mold. One method involves forcing the resin into the mold under high pressure, but that generally causes the reinforcing material to wash, i.e., become misaligned, twisted or displaced from its proper position. In my prior U.S. Pat. Nos. 2,993,822 dated July 25, 1961 and 3,028,204 dated April 3, 1962, methods of overcoming washing or displacement of the reinforcing material were disclosed. These methods involve closing the mold partially, introducing low viscosity resin at low pressure and then closing the mold completely. This has proved satisfactory in a wide range of uses, but not all. For example, in containers with at least one set of parallel or nearly parallel sidewalls it is impossible to cause male and female mold parts to assume a partially closed position with respect to all surfaces. Thus, the parallel sidewalls of the mold cannot be compressed by the closing of the mold to cause full resin wetting of the reinforcing material. A parallel-sided container causes other difficulties beyond its inability to be partially closed. The parallel sides of the male and female molds, as the molds are closed together, are moving the same relative distance from each other during closing. This relative movement tends to subject any reinforcing and core material between mating male and female mold surfaces to extreme friction and abuse, causing injury to or displacing of these materials.

In addition, the processes of my prior patents do not disclose the production of closed parallel sided containers having transverse beam strength molded in to withstand extreme loading conditions, i.e., in the floor of a truck or trailer body, or the floor and sidewalls of a cargo container.

It is thus an object of this invention to provide a method and apparatus for molding insulated reinforced plastic cargo containers and truck or trailer bodies with substantially parallel sidewalls which have high transverse beam strength molded within the floor and sidewalls and without displacement of glass fiber reinforcement or core material, or both, during all molding operations.

In molding reinforced plastic structures of the type described it is also critical to ensure thorough impregnation of the glass fiber reinforcing, and wetting of the core material by the liquid resin, and thus total displacement of entrapped air is critical.

Introduction of the resin under high pressure has not proven completely successful in providing proper impregnation and wetting, and has created other problems, as well as increased production costs. Introduction of the resin into the mold before it is completely closed and thus before the glass fiber reinforcing material is compressed, has solved the problem in some cases, but has not in others. For instance, it is impossible to bring to a partially closed position all of the faces of a male and female mold that has at least one pair of substantially parallel sides.

It is thus an additional object of this invention to provide a method and apparatus for ensuring complete impregnation of the glass fiber reinforcing and wetting of the surface of the core material in various molding situations.

In making glass fiber reinforced plastic cargo containers and the like by the ordinary means of joining individual panels together at the edges, structural weaknesses tend to develop where the panels join.

It is thus a further object of the present invention to provide a method of molding entire reinforced plastic cargo containers and the like in one piece, particularly carrying the glass fiber reinforcing around corner edges, so that this reinforcement is continuous throughout.

It is also desirable and economical to be able to produce a variety of sizes of cargo containers and truck or trailer bodies and the like from a single mold set in order to maximize the efficiency of plant equipment and minimize production costs.

It is, therefore, an object of this invention to provide a method and apparatus for molding reinforced plastic cargo containers and the like that are flexible in the size that can be molded.

While the containers and the like of the character referred to above have many uses, generally the insulation characteristic is quite important and some of the examples of prime use are in the transportation of frozen produce or perishables that must be kept cold. Infiltration of warm air into the container walls or into the load space, particularly when in motion, or the presence of air voids within the walls in which connection can occur, or moisture can condense, causing a "heat leak," or even freezing and damaging or bulging the walls, necessitates that the use of structural materials within the walls that have a high rate of heat conductivity, all must be avoided.

It is thus an object of the present invention to produce insulated cargo containers and the like that are free from these defects and have very low and very uniform heat gain characteristics.

Also, in modern methods of transporting perishables, it is often very important not only to control the temperature of the cargo but also the makeup of the atmosphere or gases surrounding it. It has been found that by varying the makeup of the gases that surround certain perishables, the length of time they will remain fresh can be extended for considerable periods. This is frequently being done in transporting perishables today. Obviously, a container or the like that leaked at its seams, or otherwise was not substantially airtight, would make it difficult to maintain the proper makeup of these gases during transit.

It is thus a purpose of this invention to provide an insulated container, or the like, that, by reason of its being molded all in one piece without any joints or seams, is virtually airtight and leakproof.

Further, when containers of the character described above are used as refrigerator truck bodies, or in large tractor-trailer van type rigs, it is necessary to incorporate various electrical wiring for electrical circuits to operate, gas lines for refrigeration equipment to operate, and also to incorporate air lines for operation of airbrakes of the running gear. Additionally, it may be desired to incorporate other added equipment features so that the refrigerated van trailer can be adapted to various uses.

It is, therefore, an additional object of the present invention to provide a method and apparatus for molding associated electrical wiring, conduit, and/or air lines within the molded container itself to thereby increase the versatility and utility of the completed container.

It is often necessary and desirable to attach ancillary equipment to the molded structure, such as hinges, door locks, keeper bars, lifting rings, etc. as well as heavy duty equipment such as running gear, landing gear, pickup plates, etc.

It is thus an object of the present invention to provide a method for incorporating metal backup plates or other attachment methods in the walls of the molded container to provide an easily accessible means to attach ancillary hardware items.

These and other objects are in part obvious and in part pointed out below.

Figure 1:
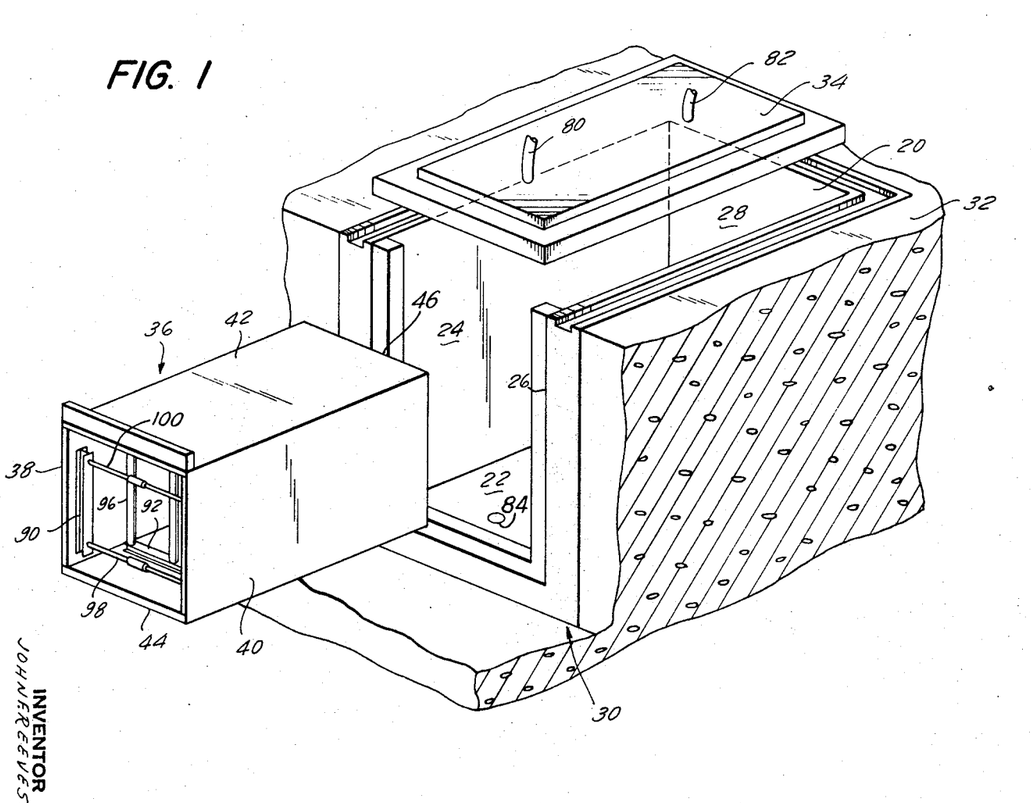
FIG. 1 is an exploded perspective view showing a female mold cavity, a male mold and the vertically braced and laterally expandable mandrel.

With reference to FIG. 1, the mold apparatus of the present invention includes a female mold cavity 20 comprising a bottom wall 22, opposed parallel sidewalls 24 and 26 and a rear wall 28. Each of the walls 24, 26 and 28 are perpendicular to the bottom wall 22 and define an open top boxlike female mold cavity with one end removed. A gasket is provided at the open end. The female mold cavity 20 can be constructed to be housed within a floor well 30 in a factory floor 32 in order to conserve floor space and reduce the requirement for over head factory height when operating the molds. A movable male mold section 34 is dimensioned to fit within the female mold cavity 20 and is vertically movable with respect to the female mold cavity. A mandrel 36 is provided to be inserted within the female mold cavity 20 and includes sidewalls 38 and 40, top wall 42, bottom wall 44, and end wall 46, and an end gate. The exterior faces of the mandrel walls 38—46 define the inside dimension of the container to be molded. The dimensional clearance between the exterior surface of the mandrel 36 and the interior walls of the female mold 20 define the thickness of the molded container.

Figure 2:
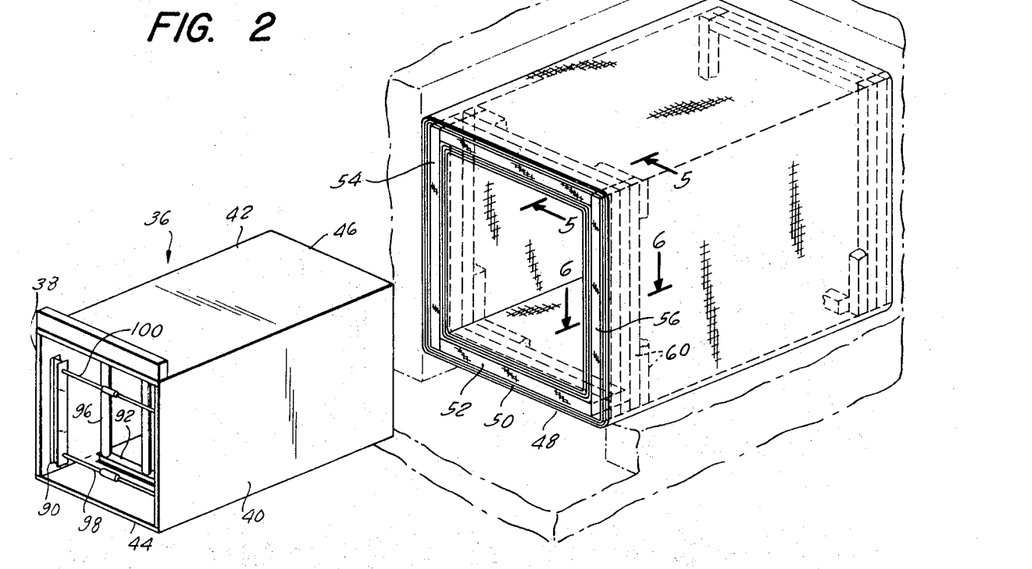
FIG. 2 is an exploded perspective view showing the lay up of glass fiber reinforcing and core material in the mold cavity with the mandrel in place.

With reference now to FIG. 2 as well as FIG. 1, the procedure for molding an insulated reinforced plastic container, truck or trailer body will be described. The container of the invention is first laid up by placing glass fiber reinforcing material, which may be in a continuous, woven, or mat form, together with a core assembly consisting of slabs of impermeable insulation material, but which have a bondable surface, such as the cut surface of a rigid urethane foam, or balsa wood, in the bottom of the female mold and up the sides and the closed end. The mandrel is inserted, additional glass fiber reinforcing and core material are laid up over the mandrel, the lay up in the female mold cavity is completed and the male mold is lowered but not completely closed to its final fully closed position. At this point a free flowing liquid resin, such as a polyester resin to which appropriate catalysts and accelerators have been added, is introduced into the mold cavity, the male and female molds are fully closed, the mandrel is expanded laterally, and the resin is allowed to cure from a liquid to a solid state.

Figure 6:
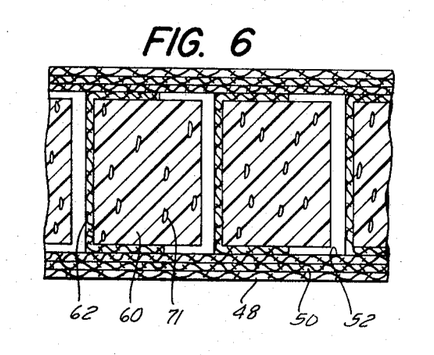
FIG. 6 is a partial section taken on line 6-6 of FIG. 2 showing the lay up for a wall section.

As viewed in FIG. 2, the top of the molded container is in the bottom of the female mold cavity 20 and the floor is located near the top of the cavity. The first step of the process is to wax the surfaces 22, 24, 26 and 28 of the female mold cavity as well as the exterior surfaces of the mandrel 36 and to coat these surfaces with a liquid parting compound which forms a thin film on the smooth skins to facilitate later removal of the cured molding. The female mold cavity 20 is now ready for the lay up of the glass fiber reinforcing materials and the core material. The first layer of glass fiber reinforcing adjacent the surface of the female mold is a finish mat 48 of fine glass fibers and is draped within the female mold cavity 20 with enough of an excess over the sides of the mold cavity to allow the mat 48 later to be folded over the mandrel and floor core material after that have been put in place. The next layer of glass fiber reinforcing is a chopped strand mat 50 of a somewhat open and coarser texture and this layer is similarly disposed within the female mold cavity. The third layer of glass fiber reinforcing is a layer of woven roving 52. Woven roving, as is commonly understood in the art, is a series of continuous fine glass fiber strands in bundle or roving form, interwoven at discrete intervals into an interlocking web of vertical and horizontal groupings. Once the outer layers of glass fiber reinforcing matting have been laid up in the female mold cavity the sidewall core material 54 and 56, and end wall core material 58 are assembled in the female mold cavity 20. The side and end wall core materials consist of vertical slabs 60 of rigid urethane foam which has been previously cut to proper length and size from burrs of rigid urethane foam which have been prefoamed. Each slab 60 is partially encased by a layer of glass fiber reinforcing 62 (see FIG. 6) which forms a C-shaped cover along the vertical extent of the slab 60. These prepared slabs are placed within the female mold cavity 20 closely spaced and in an upright position. The roof portion of the container 64 is similarly placed along the bottom wall 22 of the mold cavity 20 and is also constructed similar to the sidewalls from a plurality of rigid urethane slabs edge wrapped with C-shaped layers of glass fiber reinforcing and laid close together along the bottom extent of the mold cavity. The next step is to lay up additional layers of woven roving 66, coarse mat 68 and finish mat 70 with enough excess to lap over the mandrel and later provide the glass fiber reinforcing for the inside face of the floor.

The rigid urethane foam core material contains interspersed closed cells 71. These cells elongate during the foaming process with the major axis of the cells in the direction of foam rise. The slabs are so cut as to orient the major axis of the cells in a plane transverse to the faces of the container walls. Rigid urethane foam generally exhibits twice the tensile and compressive strength in the direction of foam rise as across the direction of foam rise. Thus, by cutting the foam slabs so that the major axis of the cells is always transverse to the faces of the container walls, the foam is most effective in holding the faces of the sandwich walls of the container in a spaced relation, and developing the strength inherent in the reinforced plastic faces when the container walls are subjected to a bending stress.

The mandrel 36 is now placed in the mold cavity 20 and the excess of the interior layers of glass fiber reinforcing materials 66, 68 and 70 is lapped over the mandrel. The core material slabs for the floor section of the container are now laid across the upper portion 42 of the mandrel 30. The floor section of the container, since it will take the greatest load concentrations, must be a more structurally rigid construction than either the roof or wall panels. Accordingly, each of the slabs of the floor foam material 72 (see FIG. 5) is wrapped completely around with a cover of glass fiber reinforcing 73 and are then placed side by side along the top of the mandrel 42. Once the floor slabs have been placed along the top of the mandrel 42, the excess of the exterior layers of the reinforcing material 48, 50 and 52 are lapped over the floor core material assembly. The entire assembly of glass fiber reinforcing material and core materials has now been formed, consisting of two pairs of opposed parallel wall surfaces and an end wall.

The male mold 34 is now lowered within the confines of the female mold cavity to within, for example, one-half inch, of its completely closed position, and the free flowing liquid resin is then pumped in over the floor area of the molding through liquid resin inlets 80 and 82 in the top of the male mold 34. Approximately 60 percent of the liquid resin to be used in making the molded container is pumped through the upper inlets 80 and 82, and floods out over the floor area impregnating the glass fiber materials and wetting the core assembly in this area. The majority of resin is pumped initially in thru the top in order to preclude a buoyant effect on the core material assembly in the bottom of the mold and the hollow mandrel, causing these to float upwardly and compress the glass fiber reinforcing and compact the core assembly in the top of the mold before these have been impregnated and wet out. While some liquid resin may flow down over the sides of the molding during this operation, the majority of the resin stays on the top because the mold is not fully closed and the glass fiber reinforcing is of a type that when uncompressed tends to swell and to absorb and hold an excess of resin. A number of resin inlets 84 are also provided in the bottom wall 22 of the female mold cavity 20 and after the resin has been injected through the male mold 34 the remainder of the liquid resin is pumped in through the bottom inlets 84. Alternatively, the balance of the resin may be pumped in thru resin inlets provided in the bottom of the mandrel, flooding out over the assembly of glass fiber reinforcing and core material in this area and similarly to the bottom of the mold.

Figure 3:
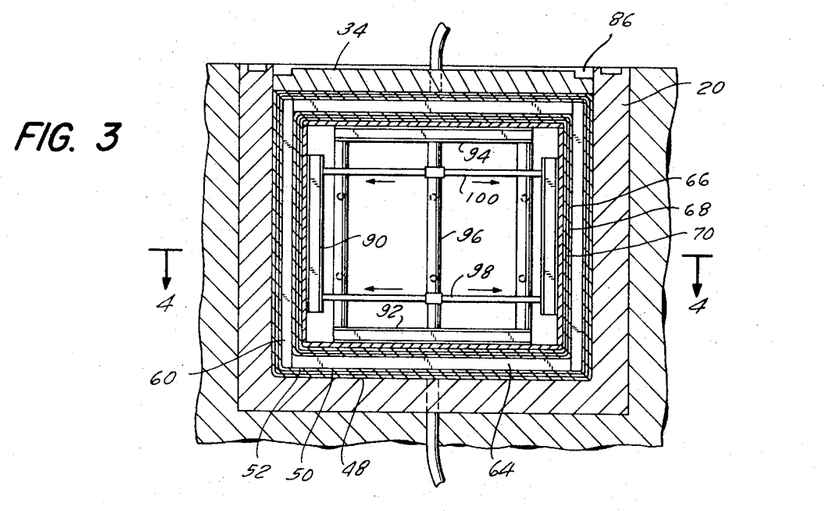
FIG. 3 is a vertical section of the mold cavity showing the female mold, the male mold, the mandrel and the lay up of core material.

With reference to FIG. 3, it is seen that the male mold 34 fits within the confines of the female mold cavity 20 but there is a slight clearance around the periphery of the male mold 34 which allows for the later formation of a head of liquid resin. This liquid head allows any excess resin to flow back down into the mold cavity to ensure complete impregnation of the glass fiber reinforcing and wetting of the core material in the mold cavity. While the resin is in a liquid state, this head also forces any bubbles of air that may remain in the mold cavity upward. A gutter 86 around the perimeter on the upper side of the male mold 34 provides a reservoir for the liquid head of resin and thus ensures an ample supply of liquid resin to flow back downward as air is released. The male mold is now forced downward by means of hydraulic jacks (not shown) to its final fully closed position, thus compressing the glass fiber reinforcing material and compacting the core material assembly in the horizontal roof and floor sections and causing a squeezing action against the vertically braced mandrel which forces the liquid resin to flow laterally into the area of the sidewalls and end wall of the container and wet more completely the lay up in the mold cavity.

Figure 4:
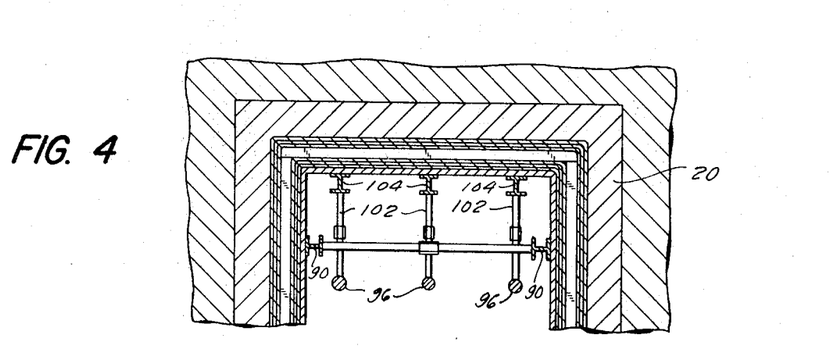
FIG. 4 is a partial horizontal section taken on line 4-4 of FIG. 3.

The mandrel 36 is now expanded outwardly compressing the glass fiber reinforcing and compacting the core material assembly in the sidewalls and end wall of the molding and causing the liquid resin to well upwardly into the gutter 86. The mandrel 36, as explained above, is made of a sheetlike material, such as ¼-inch aluminum sheets. The interior of the mandrel includes spaced vertical I-beams 90 along both sidewalls and the end wall and spaced horizontal I-beams 92 and 94 along the bottom wall and top wall, respectively, for internal structural support. Vertical support columns 96 are placed between I-beams 92 and 94 in order to provide sufficient strength to withstand the pressure exerted by the hydraulic jacks squeezing the male mold to its fully closed position. As seen in FIGS. 3 and 4, lower horizontal jack members 98 and upper horizontal jack members 100 are disposed between opposed pairs of vertical I-beams 90 and may be manually expanded in order to provide for the slight outward expansion of the mandrel. Horizontal jack members 102 between vertical posts 96 and vertical I-beams 104 along the mandrel end wall are also disposed at the lower level and the upper level in order to expand the end wall outward. The mandrel is preferably first expanded by manipulating the lower jack members 98 and 102 in order to expand the lower portion of the mandrel first and then the upper jacks 100 and upper jacks 102 are expanded. The expansion of the mandrel in this fashion causes a squeezing action on the liquid resin which forces it to well up and more rapidly impregnate the glass fiber reinforcing and wet the core material assembly while these are in an uncompressed and uncompacted condition than if the entire mandrel wall were expanded outwardly at the same time. The outward expansion of the vertical walls 38, 40 and 46 of the mandrel 36 is slight, i.e., on the order of one-quarter of an inch, and in conjunction with the slight movement of the male mold 34 to its fully closed position compresses the glass fiber reinforcing and compacts the core material assembly uniformly on all wall surfaces to the final wall thickness dimension. Centering of the core material within the container walls is accomplished by the force created by compressing the glass fiber reinforcing on one surface being transmitted thru the core material to equally compress the glass fiber reinforcing on the other surface. It will be appreciated that these materials tend to float and are not restrained by the free flowing liquid resin, and thus an equal force is readily transmitted. The slight expansion of the mandrel sidewalls is within the elastic limit and thus once the internal expansion pressure is removed the mandrel elastically returns to its original shape. Uniformity from mold operation to mold operation is maintained by accurate control of the lay up thickness.

While the mandrel 36 has been described above as being mechanically expanded by the jacks, it is of course apparent that other expanding means are equally applicable. For example, the mandrel may be vertically braced as noted above and then its end sealed and air or liquid under pressure forced into the mandrel to thus pneumatically or hydraulically expand the sidewalls of the mandrel outward.

Figure 7:
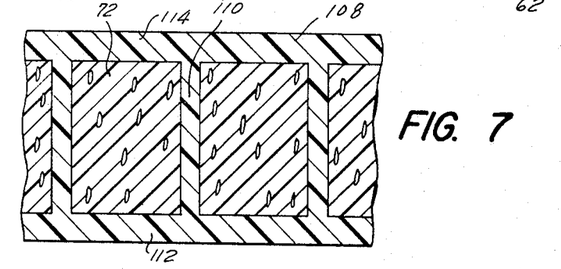
FIG. 7 is a view similar to FIG. 5 showing the floor section after it has been molded.

After the liquid resin has been allowed to cure to a solid state, the male mold is raised, the now solidified molded container is removed from the female mold cavity, and the mandrel is retracted, or disassembled and removed from the molding thru its open end. Reference is now made to FIG. 7 showing a partial cross section of a solidified container wall, for example, the floor section similar to the view shown in FIG. 5. It is noted that the slabs of rigid urethane core material 72 are surrounded by a glass fiber reinforced plastic material 108. Between each adjacent urethane core 72 the glass fiber reinforced plastic forms an I-beam having a web 110 and extending flange portions 112 and 114. Thus it is seen, for example, that the floor section of the container is formed by a series of rigidly interconnected I-beams.

Reference is now made again to FIG. 5, in which it is seen the glass fiber reinforcing in the web area does not just butt the glass fiber reinforcing in the flange area, but is continuous with the glass fiber reinforcing in the flange that is adjacent to the core. Thus, the web of the I-beam cannot readily shear free from the flange when the structure is subjected to a stress. This arrangement results in a very strong and very rigid structure which is capable of withstanding heavy loads and high stress concentrations.

Similarly, a cross section of a completed molding for the wall and roof sections would have webs between the faces but since there is only a single layer of glass fiber reinforcing covering one edge of each urethane foam core slab, the resulting structure would in effect be more akin to two faces interconnected by C-beams.

While not as strong as the continuous I-beam constructions, this is sufficient for the load conditions encountered in the walls and the roof; other variations such as hat beam constructions, Z-beam constructions, and box-beam constructions may readily be made by either preaffixing the glass fiber reinforcing to the core material or positioning around and between the edges of the core material during the lay up.

Figure 5:
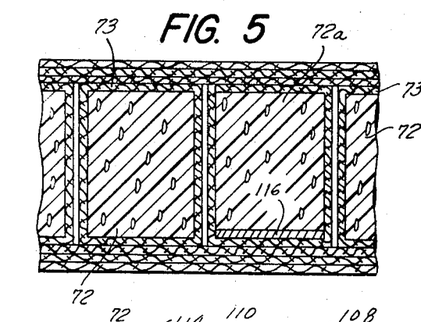
FIG. 5 is a partial section taken on line 5-5 of FIG. 2 showing the lay up for the floor section.

Since a container molded according to the principles of the present invention can be made in van trailer sizes, for example, up to 40 feet in length, it is important that provision be made to attach running gear, landing gear, pickup plate, running lights, air lines for brakes, wiring for refrigeration equipment and miscellaneous hardware such as door hinges, keeper bars, lifting rings, etc. Accordingly, at selected locations, which are predetermined for proper location, metal backup plates are included in the molding in order to provide an anchorage base to which to attach the desired ancillary equipment. With reference to FIG. 5, there is shown by way of example, a method to incorporate a metallic backup plate in the floor section in order to accommodate the subsequent attachment of trailer running gear. One of the urethane foam inserts 72a is shown having a height less than the remainder of the urethane slabs 72 to accommodate the thickness of a steel plate 116 which is placed adjacent the urethane slab 72a along its length or in a recessed section prior to its being wrapped with the glass fiber reinforcing. In this manner, after the resin has been injected into the mold and allowed to cure, the steel backup plate 116 is securely locked into the floor structure of the container and provides a secure anchorage or hard point which may later be drilled and tapped into so that running gear and the like may be reliably bolted to the container. By completely wrapping around the backup plate 116 with a layer of glass fiber reinforcing 73, the plate 116 is securely locked to the core 72, and a pulling force on the bolt will stress these fibers in tension rather than that the plate may be pulled free by delaminating the reinforced plastic face from the core.

Figure 9:
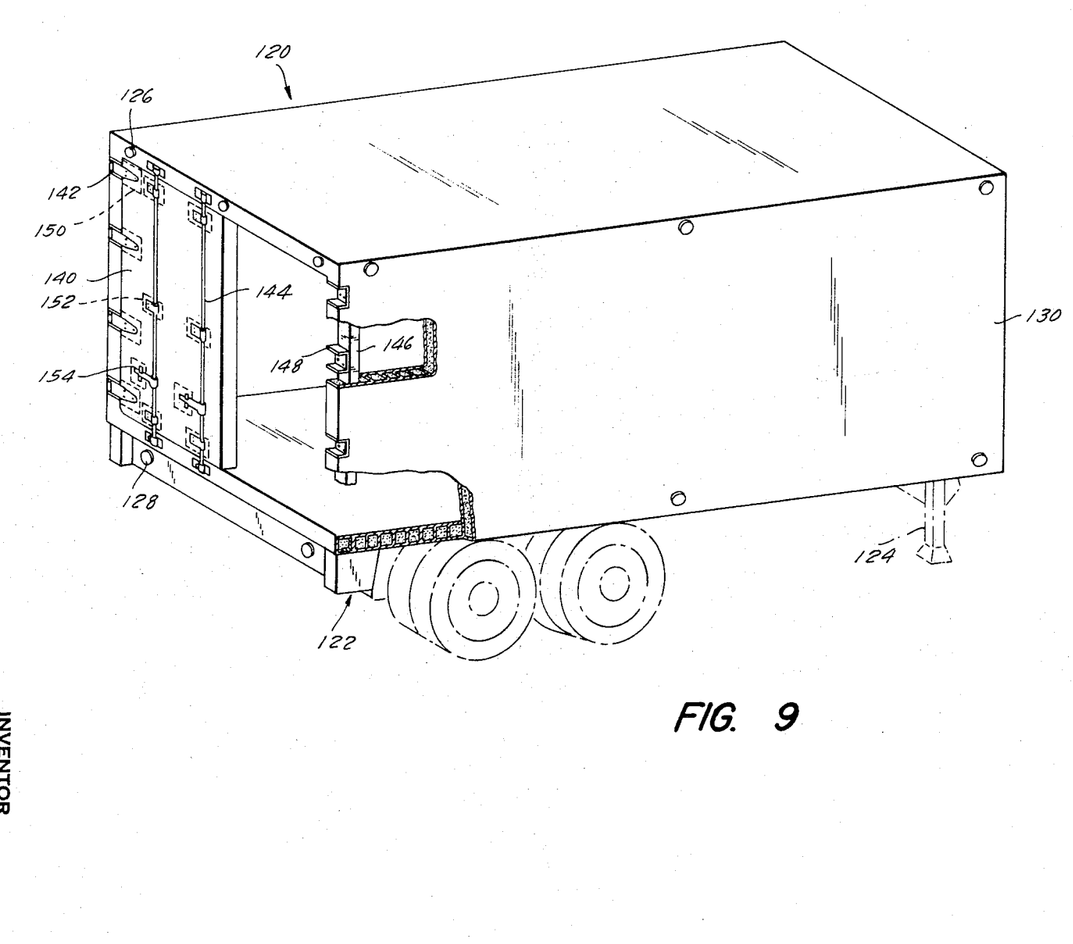
FIG. 9 is a perspective view, partly broken away, showing a completed tractor-trailer van body.

With reference now to FIG. 9, there is shown a perspective view of a completed van trailer 120 which includes a double axle running gear subassembly and associated wheels 122 and landing gear 124 to support the van trailer. The completed van also includes rear warning lights 126 and brake lights 128 which require electrical wiring to supply power from the batteries in the tractor cab (not shown). The wheels 122 also require air lines to supply pressurized air to operate the brakes. The wiring and air lines for this equipment are molded directly into the van body 120 with appropriate junction boxes and connecting points at the front end 130 of the van 120. The requirements for the number and location of the wires and hydraulic lines are predetermined and as the core material is laid up within the female mold 20 the proper wiring and air lines are recessed in the foam or laid on the surface of the foam, or on top of the glass fiber reinforcing during the lay up procedure. Preferably, the wiring and air lines are lead into break-out holes in the urethane core material and are thus completely encased within the mold walls. Alternatively, conduit, which is sealed at both ends to prevent entry of the liquid plastic, may be molded in the trailer, and wiring, air lines, etc. later fished thru, or already included in the conduit.

As also shown in FIG. 9, the rear open portion of the van 120 is closed by a molded door structure 140 which is attached to the van body 120 by hinges 142 and locked closed by keeper bars 144. As seen in the broken away portion an L-shaped channel frame member 146 is molded in the container body, in the manner described above, and provides a rigid rear mount for U-shaped channel sections 148 to which the hinges 142 of the doors are bolted. In like manner, the door panels 140 have molded within the body thereof metal backup plates 150 (shown in phantom) to accommodate the door hinge 142 and also backup plates 152 to accommodate the supporting hardware to sustain the keeper bars 144. Similarly, backup plates are positioned along the rear edge of roof panel and floor panel to anchor the keeper bar retaining members 154.

Figure 10:
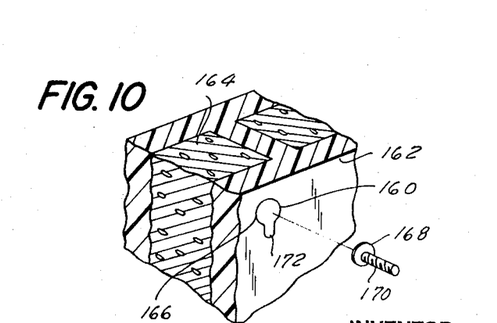
FIG. 10 is a partial sectional view showing a method for attaching objects to a wall surface.

It is also desirous to provide a method to attach the necessary ancillary hardware items such as hinges, refrigeration equipment, lifting rings, etc. or other metal to provide wear surfaces, bearing points, etc. to the surfaces of the molded container body. Accordingly, reference is made to FIGS. 10 to 18 wherein are disclosed some of the numerous variations for attaching ancillary equipment exteriorly to the container body. With reference to FIG. 10 a keyhole slot 160 is cut through the exterior exposed face 162 of a molded container wall through to the urethane foam core 164. The major diameter of the keyhole slot 166 is large enough to accommodate the head 168 of a threaded bolt member 170 so that the bolt head 168 can be inserted in the keyhole slot completely through the wall portion 162. The bolt head is then slipped down into the minor diameter 172 of the keyhole slot displacing the core material in the area with the shank of the bolt 170 extending therefrom to accommodate the threaded bore of an object to be affixed to the side of the container.

Figure 11:
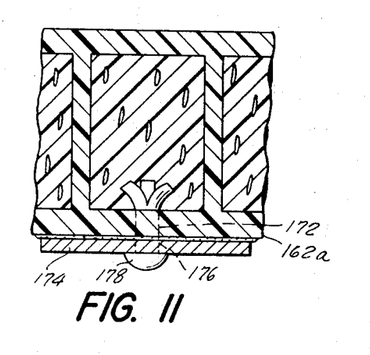
FIGS. 11 through 18 are partial sectional views showing alternate methods for attaching objects such as hardware items to a wall surface.

With reference now to FIG. 11, a hole 172 is drilled through the exposed face 162a of the molding and a metallic plate member 174 with a bore 176 in registry with the hole 172 is adhesively bonded to the face 162a of the molding. A blind fastening element 176, such as a drive rivet, a pop rivet or a rivet nut, is inserted into the holes and then expanded on the inside in the core. In this manner, the metallic plate element 174 is securely affixed to the exposed face of the molding 162a to provide an anchorage to receive desired hardware attachments.

Figure 12:
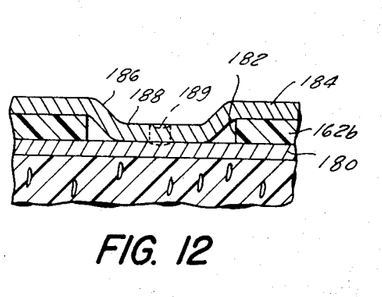

With reference to FIG. 12, a metallic plate 180 which has been molded within the molding wall, in the manner described above, is positioned immediately behind the exposed outer wall 162b of the molding. A bore 182 is drilled through the outer face 162b to expose the metal plate 180 and an exterior metal plate 184, having a dimpled portion 186 is placed over the exposed wall 162b with the dimple 186 in registry with the bored hole 182 so that the central portion 188 of the dimple abuts the exposed metal backup plate 180. The plate 184 is then spot welded to the metal backup plate 180, as at 189, and is thus securely attached to the metal plate embedded in the molding.

Figure 13:
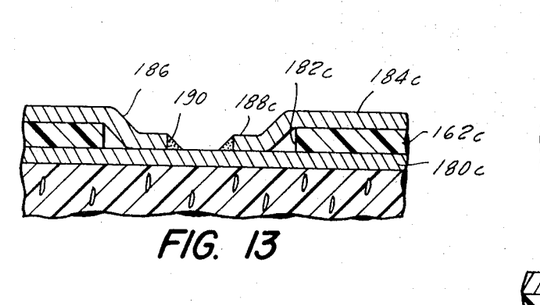

With reference to FIG. 13, a metal plate 180c, which has been molded within the molding wall, is exposed by drilling a bore 182c through the exposed outer face 162c, in the manner described in respect to FIG. 12, and a plate member 184c having a dimpled portion 186c and a bore 190 in the central section 188c is placed in abutment with the backup plate 180c. Plate 186c is then welded around the periphery of bore 190 to the backup plate 180c and is thus securely attached to the metal embedment in the molding.

Figure 14:
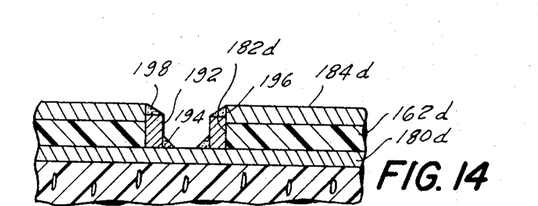

With reference to FIG. 14, the backup plate 180d is exposed by a bore 182d through the exposed outer face 162d and a short pipe section 192 is placed in the bore 182d and welded, as by a weld 194, to the backup plate 180d. An exterior metal plate 184d which has a bore 196 is placed over the pipe section 192 and welded thereto, as by a weld 198, to securely fix the exterior plate 184d to the molding wall.

Figure 15:
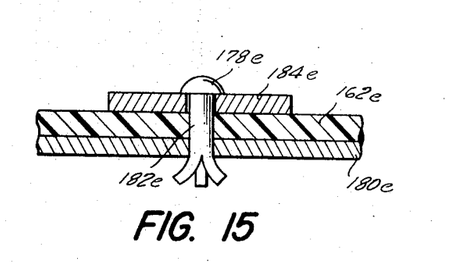

With reference to FIG. 15, a hole 182e is drilled through the exposed outer face 162e and through the metal backup plate 180e and a metal exterior plate 184e having a bore 176e in registry with a hole 182e is placed adjacent the exterior face of wall 162e. A blind fastening 182e such as a drive rivet, pop rivet, or the like, is inserted into the hole 184e and expanded to firmly secure the exterior plate 184e to the interior plate 180e.

Figure 16:
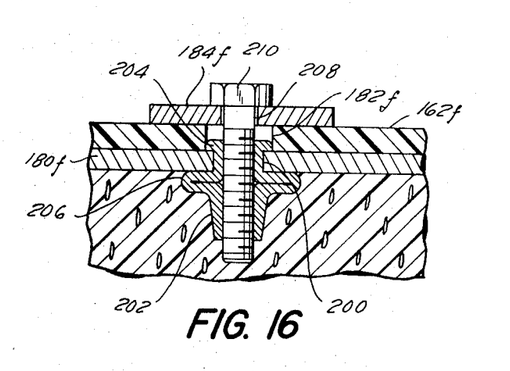

With reference to FIG. 16, a hole 182f is drilled through the exposed outer wall 162f to the plate 180f and then a smaller diameter hole 200 is drilled through the plate 180f. A rivet nut 202 having a collar 204 is inserted through holes 182f and 202 so that the collar 204 rests on the plate 180. The rivet nut is then upset, as at 206, to secure the rivet nut 202 to the backup plate 180f. A plate 184f having a bore 208 in registry with the bore of the rivet nut 202 is placed on the exposed face of bore 162f and a threaded stud 210 is passed through the plate 180f to engage the threaded bore of the rivet nut 202 and firmly secure the exterior plate 184f to the molding wall.

Figure 17:
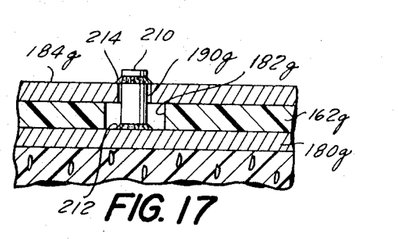

With reference to FIG. 17, a hole 182g is bored through outer face 162g to expose the backup plate 180g and a stud member 210 is welded, as by a weldment 212, to the plate 180g. An exterior metallic plate member 184g having a bore 190g is placed adjacent the outer face 162g so that the bore 190g fits over, and closely around, the extending stud 210 and is then welded, as by a weldment 214, to the stud 210 thus securing the outer plate 184g to the inner plate 180g.

Figure 18:
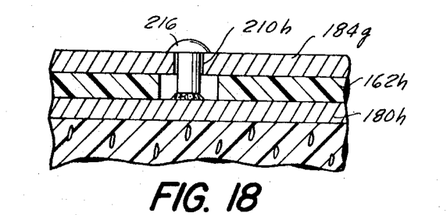

With reference to FIG. 18, a stud 210h is welded to backup plate 180h, in a manner similar to the stud in the embodiment shown in FIG. 17, and a plate 184g is placed thereover and the exposed end of stud 210h is peaned over the outer face of plate 184g to securely lock the plate 184g to the molding.

It is thus seen from the various embodiments shown in FIGS. 10 to 18 that numerous methods are available for affixing ancillary hardware items and metal attachments to the exposed walls of the molded container. It is apparent that the requirements for these hardware items must be carefully engineered and metallic backup plates 180 positioned in the mold during lay up at the required locations. The general location of the reinforced backing plate is known and it is a relatively simple matter to pinpoint the exact location of the plate by running a magnet across the outer surface of the molding.

Figure 8:
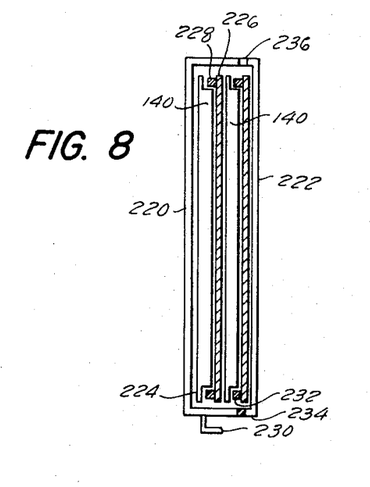
FIG. 8 is a vertical section of a mold to make flat door panels.

With reference now to FIG. 8, there is shown a method of molding a flat door panel for use in conjunction with the molded containers and truck or trailer bodies of the present invention. A number of door panels 140, for example, two to four, may be molded in a single operation within an upright rectangular female mold cavity 220 and a movable male mold 222. A lay up of each individual door frame 140 is prepared in the manner described above, i.e., urethane foam panels edge wrapped with glass fiber reinforcing which are in turn wrapped with surface layers of glass fiber reinforcing. Appropriately located backup plates are incorporated into the door assembly at predetermined locations to allow for the addition of ancillary hardware items such as hinges, brackets for the keeper bars and the like. The door panels are prepared so that they are substantially rectangular with a finger extension 224 around the perimeter of the door panel to allow for the addition of an insulating type of gasketing around the perimeter so that when the doors are shut there is a minimum "heat leak" and the doors are sealed against the container. Spacer plates 226 which have an additional spacer member 228 around the periphery to define the finger extension 224 are placed between each adjacent door panel and the last door panel in the female mold 220 and the male mold 222. A resin inlet 230 is provided at the bottom of the female mold to inject the free flowing liquid resin. Gasketing 232 is provided around three sides of the mold at the junction of the male and female molds leaving the upper side open to act as a riser for the liquid head of resin. After the lay up of the door panels in the mold, the male mold is closed to within, for example, one-half inch of its final closing, and the liquid resin is injected into the mold cavity. The male mold 222 is hinged to the female mold section 220 along the bottom portion 234 and after the liquid resin has been injected into the mold cavity the male mold is closed by a hinging action so that the door panels are compressed first at the bottom and then, as the hinging action of closure proceeds, progressively upward causing the liquid resin to well up in the mold cavity and fully impregnate this glass fiber reinforcing and wet completely the surfaces of the core material. When the male mold is fully closed, the liquid resin wells up to the space 236 at the top of the mold and remains there as a reservoir of liquid resin to act as a head and flow downward to disperse any air pockets in the molding. After the resin has cured, the molds are opened and the individual door panels are removed. Any flashings around the edges of the door panel, since they do not contain glass fiber reinforcing, break off easily and a well defined molding results.

It is thus seen that with the process and the apparatus of the present invention a unique, unitary molded construction is obtainable to produce insulated reinforced plastic containers and truck or trailer bodies in lengths of up to 40 feet and more. The process and apparatus permit molding of containers and truck or trailer bodies having substantially parallel opposed sides which are exceedingly strong and, due to the incorporation of I-beams, C-beams, etc. within their structure, are able to withstand exceedingly high stress concentrations and loads. Further, the method of the present invention overcomes serious objections in prior art methods which made it difficult to force the molds closed or caused the displacement of the reinforcing material and other components of the material assembly while closing the mold and, thus, consistently uniform molded containers and truck or trailer bodies are obtainable. In addition, the method of the present invention provides for novel methods of affixing ancillary hardware items and making metal attachments to the completed container in a manner which effectively secures such hardware items and metal attachments to the plastic walls of the container for maximum strength, reliability and with the additional benefit of allowing repeated attachment and disattachment for maintenance and/or replacement of the hardware items.

I claim:

1. A unitary molded plastic structure with substantially parallel opposed faces, said structure comprising a plurality of longitudinally and transversely spaced elongated slabs of foamed impermeable material and of rectangular parallelepiped shape, a porous fibrous reinforcing material in sheet form encasing each of said slabs and spacing said slabs from each other, porous fibrous reinforcing material in sheet form extending continuously on each of said opposed faces and spaced from said slabs by said reinforcing material encasing said slabs, and a plastic resin filling the voids of both said porous fibrous reinforcing material encasing said slabs and said reinforcing material on each of said faces and being cured so that said reinforcing material encasing said slabs is bonded to said slabs and bonded to each of said layers of fibrous reinforcing material in said faces and thereby forming an integrated structure.

2. The molded structure as defined in claim 1 wherein said reinforcing material, bonded with said resin, substantially encases and is continuous about the faces of said slabs to form a series of side-by-side reinforcing beams.

3. The molded structure as defined in claim 1 wherein said slabs comprise closed cell plastic foam material in which said cells are elongated along an axis lying substantially transverse to said faces.

4. The molded structure as defined in claim 1 wherein each of said slabs of impermeable material includes a pair of sides parallel to said faces and said fibrous reinforcing material extends about said two sides so as to be bonded to said fibrous reinforcing material extending parallel to said faces to form a substantially C-shaped channel about each of said slabs.

5. The molded structure as defined in claim 1 wherein each of said slabs of impermeable material includes a pair of sides parallel to said faces and said fibrous reinforcing material completely encases said slabs so that said fibrous reinforcing material encasing said slabs and bonded to fibrous reinforcing material extending parallel to said faces form a plurality of contiguous I-beams.

6. The invention as defined in claim 1 wherein a keyhole slot is formed in one face of said wall, and a headed bolt is inserted in said slot with the shank projecting outwardly to receive auxiliary mounting equipment.

7. The invention as defined in claim 1 in which an external metal plate is adhesively bonded to one face of said wall, a bore in said external plate registering with a bore in said wall, and blind fastener means inserted in said bores for fastening said external plate to said wall.

8. The invention as defined in claim 1 wherein a metal plate is disposed between said fibrous reinforcing material encasing said slab and said slab, a bore in a face of said wall adjacent said plate and extending in to said plate, an external metal plate having a bore in alignment with said first-mentioned bore, and fastening means extending through said external plate bore and said first mentioned bore for fastening said external plate on said wall.

9. The invention as defined in claim 1 wherein said structure comprises a pair of opposing walls projecting integrally from a bottom wall, and wherein at least one additional layer of reinforcing material extends continuously about the juncture of said sidewall with said bottom wall.

10. The invention as defined in claim 1 wherein said structure comprises a bottom wall, an opposing top wall, a pair of opposing sidewalls integral with said bottom wall and said top wall, an end wall integral with said bottom, top, and sidewalls and wherein at least one additional layer of reinforcing material extends continuously about the junctures of said bottom, top, end and sidewalls.

75

UNITED STATES PATENT OFFICE
CERTIFICATE OF CORRECTION

Patent No. 3,557,992     Dated January 26, 1971

Inventor(s) John Frederick Reeves

It is certified that error appears in the above-identified patent and that said Letters Patent are hereby corrected as shown below:

In line 9 of column 10 after "longitudinally" insert

--extending--

Signed and sealed this 7th day of March 1972.

(SEAL)
Attest:

EDWARD M. FLETCHER, JR.
Attesting Officer

ROBERT GOTTSCHALK
Commissioner of Patents